United States Patent Office 3,461,053
Patented Aug. 12, 1969

3,461,053
PROCESS FOR DECOLORIZING SULFONATE CONTAINING DETERGENTS
Harold L. Dimond, Ross Township, Allegheny County, and Vincent J. Pascarella, Oakmont, Pa., assignors to Gulf Research & Development Company, Pittsburgh, Pa., a corporation of Delaware
No Drawing. Filed June 1, 1965, Ser. No. 460,513
Int. Cl. C07c 3/24, 3/14; B01j 1/10
U.S. Cl. 204—162
8 Claims

ABSTRACT OF THE DISCLOSURE

A process is provided for decolorizing a dry solid form detergent by subjecting the dried detergent in solid form to ultraviolet radiation to obtain a detergent having a lowered Klett number. The detergent is prepared by reacting a gaseous stream containing an inert gas and $SO_3$ with an olefin to obtain a sulfonation product and thereafter reacting the sulfonation product with a basic reagent such as an aqueous solution of sodium hydroxide to obtain the corresponding basic reaction product of said sulfonation product.

This invention relates to a process for preparing a detergent and more particularly to a process for preparing a detergent starting with olefins and $SO_3$.

Olefins, such as alpha olefins, can be reacted with gaseous $SO_3$ to obtain a sulfonation reaction product. The latter can then be reacted with a basic reagent, such as sodium hydroxide, to obtain a basic reaction product which is useful as a detergent. In the reaction between the olefin and the $SO_3$ equal molar amounts thereof are sufficient to obtain the desired sulfonation product. Since the sulfonation reaction is highly exothermic and is quite rapid, and especially when more than equal molar amounts of $SO_3$ are employed or localized portions of the reaction zone contain more than equal molar amounts of $SO_3$, the reaction between the sulfonation product and the basic reagent results in a detergent product having undesirable color characteristics. The dark colored detergent obtained in such cases renders the same unattractive for commercial purposes. We have found that such detergents can be rendered attractive by decolorization thereof which involves subjecting the same under selected conditions to ultraviolet radiation.

Olefins that can be employed in the above reaction with $SO_2$ are those having from two to 40 carbon atoms, preferably having from 10 to 22 carbon atoms. Preferably alpha olefins within the above-defined carbon number range are employed. Examples of olefins that can be employed are ethylene, propylene, butene-1, isobutene, pentene-1, isoptene-1, 3-methyl-1-butene, hexene-1, heptene-1, octene-1, nonene-1, decene-1, undecene-1, dodecene-1, tridecene-1, tetradecene-1, pentadecene-1, hexadecene-1, heptadecene-1, octadecene-1, nonadecene-1, eicosene-1, heneicosene-1, docosene-1, tricosene-1, tetracosene-1, pentacosene-1, hexacosene-1, heptacosene-1, octacosene-1, nonacosene-1, triacontene-1, hentriacontene-1, dotriacontene-1, tritriacontene-1, tetratriacontene-1, pentatriacontene-1, hexatriacontene-1, heptatriacontene-1, octatriacontene-1, nonatriacontene-1, tetracontene-1, cyclopentene, cyclohexene, cyclooctene, 4-methyloctene-1, 7-methyldecene-1, 6,9-diethylundecene-1, 5,7-dimethyldodecene-1, etc.

Gaseous $SO_3$ is employed so that the molar ratio thereof relative to the olefin is within a range of about 0.9 to about 1.25 mols of $SO_3$ per mol of olefin, preferably within a range of about 0.95 to about 1.00 mol of $SO_3$ per mol of olefin. In order to help moderate the temperature within the reaction zone, to serve as a diluent within the reaction zone, as a carrier gas thereof, the $SO_3$ is introduced into the reaction zone in admixture with an inert gas, such as nitrogen, air, $SO_2$, $CO_2$, helium, etc. The volume percent of $SO_3$ in the incoming gaseous stream can be maintained within a range of about one to about 20 percent, preferably within a range of about three to about 10 percent. The temperature in the reaction zone can be from about 0° to about 100° C., preferably from about 20° to about 80° C., and the pressure, for example, from about atmospheric to about 50 pounds per square inch gauge, preferably from about five to about 15 pounds per square inch gauge.

The sulfonation stage of the press is carried out continuously. Thus, the olefin is introduced into an elongated reaction zone and the same is permitted to flow therethrough as a film along the inner walls thereof. $SO_3$ as a gas is also introduced into the reaction zone and is directed in any convenient manner onto the film of olefin. Since the reaction between the olefin and the $SO_3$ is exothermic, heat removal from the reaction zone is essential, and this is preferably effected by maintaining the reaction zone in indirect contact with a cooling medium, such as water.

The time required for reaction between the olefin and $SO_3$ is difficult to define, since the olefin is a liquid and the $SO_3$ is in the gaseous state, but the reaction is exceedingly fast. In practice the reaction zone is so designed and the flow of reactants therethrough is so adjusted that as soon as reaction between the $SO_3$ and olefin is effected the sulfonation product resulting from such reaction is removed from the reaction zone. In general the residence time can be, for example, less than about 120 seconds, preferably from about 0.1 to about 60 seconds.

The sulfonation product obtained can then be cooled to a temperature of about 15° to about 40° C. and the pressure reduced, for example, to about atmospheric pressure. Inert gases and any unreacted $SO_3$ present can thus be removed from the reaction mixture and recycled, if desired, to the sulfonation stage of the process. The remainder of the reaction product can then be treated with a basic reagent in order to obtain a detergent therefrom.

Basic reagents that can be employed in the reaction can be organic basic reagents, for example, salts of carboxylic acids, metal salts of hydrocarbons, imines, amines, aminoalcohols, quaternary ammonium hydroxides, salts of alcohols, salts of amines, salts of imines, salts of imides and salts of amides, such a potassium acetate, sodium benzoate, phenyl sodium, butyl lithium, benzalanaline, benzaldimine, ethyleneimine, trimethylamine, diethylamine, pyridine, piperidine, urea, thiourea, aniline, beta picoline, cyanamide, ethanolamine, 2 - hydroxy - 4 - aminopentane, tetramethylammonium hydroxide, ethyltrimethylammonium hydroxide, sodium methoxide, tetramethylammonium propoxide, sodium salt of ethylamine, sodium anilide, potassium salt of ethyleneimine, sodium salt of benzaldimine, potassium phthalimide, sodium succinimide, sodium succinimide, sodium acetamide, potassium acetanilide, etc., or inorganic basic reagents, for example, ammonia, ammonium hydroxide, potassium hydroxide, sodium hydroxide, sodium carbonate, barium hydroxide, calcium hydroxide, magnesium hydroxide, strontium hydroxide, sodium bicarbonate, potassium bicarbonate, potassium carbonate, sodamide, hydroxylamine, water, etc. The basic reagents defined above required in the reaction are approximately stoichiometric amounts, sufficient to react with the sulfonation product. A somewhat lighter detergent product will be obtained if slightly more than the stoichiometric amount of basic reagent is employed so that the reaction mixture is slightly basic. The basic reagents are employed, for example, preferably either as aqueous solutions, wherein the concentration therein is from about one to about 75 percent by weight, preferably from about two to about 20 percent by weight, or as alcoholic solutions, wherein the concentration is from about one percent by weight to about 25 percent by weight, preferably from about two to about 20 percent by weight. Alcohols that can be employed in preparing the defined alcoholic solutions are those having from one to 20 carbon atoms, preferably from about one to ten carbon atoms, such as methanol, ethanol, propanol, isopropanol, n-butyl alcohol, isobutyl alcohol, t-butyl alcohol, amyl alcohol, isoamyl alcohol, hexanol, cyclohexanol, 4 - methyl - pentanol, 3 - methyl-pentanol, 2-methyl-pentanol, 2,3 - dimethyl-butanol, 1,3 - dimethyl-butanol, n-decanol, n-pentadecanol, n-octadecanol, n-eicosanol, etc.

In reacting the sulfonation product with the defined basic reagent a temperature of about 75° to about 250° C., preferably of about 95° to about 175° C., and a pressure of about atmospheric to about 250 pounds per square inch gauge, preferably of about 14.7 to about 175 pounds per square inch gauge, are employed. The amount of time required for the reaction is critical, in order to avoid the formation of decomposition and/or degradation products that would tend to discolor the final detergent and reduce the effective quality thereof, but is dependent upon the temperature employed, a high temperature of about 150° to about 250° C., preferably about 170° to about 180° C., requiring a minimum reaction time of at least about 0.001 to about eleven minutes, preferably at least about ½ to about three minutes, and a low temperature of about 75° to about 150° C., preferably about 95° to about 100° C., requiring a minimum reaction time of at least about elevent to about 2000 minutes, preferably at least about 350 to about 500 minutes.

At the end of this period the reaction product resulting is treated to obtain the desired detergent. The reaction product comprises essentially the desired product, which is composed essentially of basic alkenesulfonates and basic hydroxyalkenesulfonates, such as sodium alkenesulfonates and sodium hydroxyalkanesulfonates, respectively, water or other solvent employed; a slight amount of unreacted olefins, which can be permitted to remain in admixture with the detergent; and some alcohol insoluble impurities, which can also be permitted to remain in the final detergent. To obtain the effective detergent the basic reaction product is heated to a temperature which can be, for example, about 100° to about 200° C., by passage, for example, through a drum drier or a spray drier, to remove the water or other solvent from the reaction product. The remaining product can be employed as such as a detergent directly or it can be combined with, for example, from about 60 to about 85 percent by weight of builders, such as tri- or tetrasodium polyphosphate, sodium sulfate, sodium silicate, water, carboxymethyl cellulose, etc., traces of dyes, perfumes, tarnish inhibitors, or inserts, etc., for a desirable detergent mixture.

The reactions involved herein are believed to proceed as follows. In the sulfonation stage a mol of $SO_3$ can react with an olefin, such as an alpha olefin, according to the following procedure to obtain a mixture of alkenesulfonic acids and a sultone:

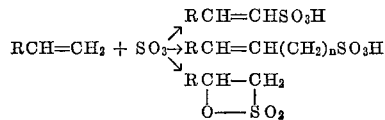

wherein $n$ is an integer (including zero).

The mixture so obtained is then treated with approximately stoichiometric, but preferably somewhat more than stoichiometric, amounts of a basic reagent, for example, sodium hydroxide to obtain a mixture containing sodium alkene- and sodium hydroxyalkane-sulfonates. Apparently during the treatment the sultone ring is opened in the reaction with the basic reagent, and for such reason a high temperature with short residence time or a low temperature with long reaction time is required during such reaction.

As noted above, the reactions leading to the desired detergent do not always lead to a desirable white detergent but one having a color of light brown, tan to cream color. We have found that a detergent produced herein having undesirable color characteristics can be decolorized by subjecting the same to ultra violet radiation under selected operating conditions. We have found that such decolorization can be effected only if the detergent is in a dry, powdery form. Since it is known that water does not screen out ultra violet rays, and the detergent produced herein is soluble in aqueous solutions, it was expected that by dissolving the detergent in water, the molecules thereof would be dispersed therein in a more elementary manner and for such reason would be more amenable to ultra violet radiation. Instead, it was found that there was no improvement in color of a detergent when the same was dissolved in water and subjected to ultra violet radiation, but that an appreciable improvement in color was obtained when the detergent was subjected to such action while it was in a dry form.

The treatment of the detergent in order to decolorize the same is relatively simple and merely involves subjecting it in a dry state, and preferably in powdered form, to the effects of ultra violet radiation or white light. The amount of time required will vary, of course, depending upon the color of the detergent to be treated and the color desired in the final detergent. Thus, the time can be at least about 30 minutes, but preferably is from about two hours to about several days. Any suitable temperature or pressure can be employed. Thus the temperature can be from about 0° to about 200° C. and the pressure from about one to about 200 pounds per square inch gauge. Any ultraviolet radiation source, for example, low, medium or high pressure mercury lamps, and/or other lamps which emit light of a similar range of wave lengths can be employed as the radiation source. The light from such radiation source can be defined as one having a wave length of from about 2000 to about 7000 A., preferably from about 2000 to about 4000 A. One such source is a so-called black light mercury vapor lamp. This is essentially a high pressure photoflood bulb which emits in the range 3200 to 7000 A. In normal use it is convenient to pass such light through a filter such as is used in fluorescent experiments, which narrows the range to 3200 to 4000 A. Under the same conditions of temperature and pressure, white light has been found effective. Any convenient source of radiation in the visible region can be employed, whether natural or artificial. The limits of radiation in such case are 4000 to 7000 A., the preferred range being 4000 to 5500 A. One such source of radiation is, for example, a 300 or 500 watt floodlamp.

The process can further be illustrated by the following:

Example I

Into a reactor having an internal diameter of 0.75 inch and a length of 22.5 feet there was flowed over a period of 1.2 hours and at a constant rate 0.7658 pound of a mixture containing 96.5 percent by weight of hexadecene-1, 2.4 percent by weight of tetradecene-1 and 1.0 percent by weight of octadecene-1. The alpha olefin mixture was permitted to flow downwardly in the reactor at atmospheric pressure as a film on the inner walls thereof. At the same time there was introduced at a constant rate into the reactor onto the alpha olefin film a gaseous mixture composed of 0.7713 mol of $SO_3$ as a five percent volume mixture in air. The reaction zone was maintained at a temperature of about 80° to 100° C. by indirect contact with cooling water. The reaction between the $SO_3$ and the olefin was rapid and the resultant sulfonated product, which was slightly viscous, was permitted to flow along the inner wall of the reactor and was recovered, after the escape of unreacted gas and nitrogen therefrom, in a receiver. To the total reaction product remaining there was added 107 pounds of water and 7.32 pounds of sodium hydroxide so that the concentration of the latter in the aqueous solution was about 6.4 percent. The reaction mixture was maintained at a temperature of about 80°–85° C. and atmospheric pressure for three days, during which time the mixture was continuously stirred. The pH of the resulting product was adjusted to 8.0 by titration with 5 normal sulfuric acid. This was done to neutralize most of the sodium hydroxide present. The resultant product was spray dried over a period of seven days at a temperature of 138° C. to obtain the final detergent. The amount of water, alcohol insoluble materials and neutral oils (unreacted alpha olefin, impurities, etc.) in the detergent was determined by ASTM method D-1568. It was determined that the amount of detergent present (sodium sulfonates) in the dried product amounted to 97–98 percent by weight. The Klett number of the dry detergent was found to be 770. The Klett number is determined in the conventional manner using a five percent solution, a 40 millimeter cell and a #42 filter. About one gram of the dry detergent so obtained was subjected to ultraviolet radiation over a period of 25 days with occasional stirring, using a filtered high pressure ultraviolet radiation source emitting in the range of 3200 to 4000 A. The Klett number of the resultant product was reduced to 173.

Example II

The run of Example I was repeated using a mixture containing 98.3 percent by weight of octadecene-1, 0.8 percent by weight of hexadecene-1 and 0.9 percent by weight of eicosen-1. The final dry detergent was found to have a Klett number of 720. One gram of this sample was subjected to ultraviolet radiation using a 200-watt (black light) ultraviolet bulb equipped to filter out visible light over a period of 22 hours and the sample turned from tan to white. Another one gram of the detergent having a Klett number of 720 was subjected to radiation over a period of two hours using a 150 watt, white light bulb spaced about three to four inches from a layer of the sample. The sample turned from tan to near white. An additional four hour treatment rendered the sample whiter still.

Example III

A 15 percent aqueous solution containing five grams of the detergent obtained in Example II having a Klett number of 720 was subjected to ultraviolet radiation as in Example II over a period of 20 hours. The treated sample was dried to remove water therefrom, and was found to be the same in color as the original charge.

Example IV

Improper neutralization of some of the product of Example I which employed a mixture containing 96.5 precent by weight of hexadecene-1, 2.4 percent by weight of tetradecene-1 and one percent by weight of octadecene-1 produced a final dry detergent having a Klett number of 360. This occurred because a sample, containing insufficient base for complete neutralization, was accidentally allowed to digest for a long period of time. A 10 percent aqueous solution containing five grams of this detergent was subjected to ultraviolet radiation as in Example I over a period of four hours. The Klett number of the sample was found to be 375. When the sample was subjected to unltraviolet radiation over a period of 16 hours the Klett number rose to 380.

Obviously many modifications and variations of the invention, as hereinabove set forth, can be made without departing from the scope thereof, and therefore only such limitations should be imposed as are indicated in the appended claims.

We claim:

1. A process for preparing a detergent which comprises bringing together a gaseous stream containing an inert gas and $SO_3$ with an olefin under conditions to effect reaction between said $SO_3$ and said olefin and obtain a sulfonation product thereof, reacting said sulfonation product with a basic reagent to obtain the corresponding basic reaction product of said sulfonation product, drying said latter product to solid form and thereafter subjecting the dried product in solid form to ultraviolet radiation to obtain a detergent having a lowered Klett number.

2. A process for preparing a detergent which comprises bringing together a gaseous stream containing an inert gas and $SO_3$ with an olefin under conditions to effect reaction between said $SO_3$ and said olefin and obtain a sulfonation product thereof, reacting said sulfonation product with an aqueous solution of sodium hydroxide to obtain the corresponding basic reaction product of said sulfonation product, drying said latter product to solid form and thereafter subjecting the dried product in solid form to ultraviolet radiation to obtain a detergent having a lowered Klett number.

3. A process for preparing a detergent which comprises bringing together a gaseous stream containing an inert gas and $SO_3$ with a $C_{16}$ alpha olefin under conditions to effect reaction between said $SO_3$ and said olefin and obtain a sulfonation product thereof, reacting said sulfonation product with an aqueous solution of sodium hydroxide to obtain the corresponding basic reaction product of said sulfonation product, drying said latter product to solid form and thereafter subjecting the dried product in solid form to ultraviolet radiation to obtain a detergent having a lowered Klett number.

4. A process for preparing a detergent which comprises bringing together a gaseous stream containing an inert gas and $SO_3$ with a $C_{18}$ alpha olefin under conditions to effect reaction between said $SO_3$ and said olefin and obtain a sulfonation product thereof, reacting said sulfonation product with an aqueous solution of sodium hydroxide to obtain the corresponding basic reaction product of said sulfonation product, drying said latter product to solid form and thereafter subjecting the dried product in solid form to ultraviolet radiation to obtain a detergent having a lowered Klett number.

5. A process for preparing a detergent which comprises bringing together a gaseous stream containing an inert gas and $SO_3$ with an olefin, wherein the molar ratio of $SO_3$ to said olefin is maintained within a range of about 0.9 to about 1.25 mols of $SO_3$ per mol of olefin and the volume percent of $SO_3$ in said gaseous stream is within a range of about one to about 20, at a temperature of about 0° to about 100° C. to effect reaction between said $SO_3$ and said olefin and obtain a sulfonation product thereof, reacting said sulfonation product with an aqueous solution containing at least the stoichiometric amount of sodium hydroxide to obtain the corresponding basic reaction product of said sulfonation product, drying said latter product to solid form and thereafter subjecting the dried product in solid form to ultraviolet radiation to obtain a detergent having a lowered Klett number.

6. A process for preparing a detergent which comprises bringing together a gaseous stream containing an inert gas and $SO_3$ with a film of an alpha olefin, wherein the molar ratio of $SO_3$ to said olefin is maintained within a range of about 0.9 to about 1.25 mols of $SO_3$ per mol of olefin and the volume percent of $SO_3$ in said gaseous stream is within a range of about one to about 20, at a temperature of about 0° to about 100° C. to effect reaction between said $SO_3$ and said olefin and obtain a sulfonation product thereof, reacting said sulfonation product with an aqueous solution containing at least the stoichiometric amount of sodium hydroxide to obtain the corresponding basic reaction product of said sulfonation product, drying said latter product to solid form and thereafter subjecting the dried product in solid form to ultraviolet radiation to obtain a detergent having a lowered Klett number.

7. A process for preparing a detergent which comprises bringing together a gaseous stream containing an inert gas and $SO_3$ with a film of a $C_{16}$ alpha olefin, wherein the molar ratio of $SO_3$ to said olefin is maintained within a range of about 0.9 to about 1.25 mols of $SO_3$ per mol of olefin and the volume percent of $SO_3$ in said gaseous stream is within a range of about one to 20, at a temperature of about 0° to about 100° C. to effect reaction between said $SO_3$ and said olefin and obtain a sulfonation product thereof, reacting said sulfonation product with an aqeous solution containing at least the stoichiometric amount of sodium hydroxide to obtain the corresponding basic reaction product of said sulfonation product, drying said latter product to solid form and thereafter subjecting the dried product in solid form to ultraviolet radiation to obtain a detergent having a lowered Klett number.

8. A process for preparing a detergent which comprises bringing together a gaseous stream containing an inert gas and $SO_3$ with a film of a $C_{18}$ alpha olefin, wherein the molar ratio of $SO_3$ to said olefin is maintained within a range of about 0.9 to about 1.25 mols of $SO_3$ per mol of olefin and the volume percent of $SO_3$ in said gaseous stream is within a range of about one to about 20, at a temperature of about 0° to about 100° C. to effect reaction between said $SO_3$ and said olefin and obtain a sulfonation product thereof, reacting said sulfonation product with an aqueous solution containing at least the stoichiometric amount of sodium hydroxide to obtain the corresponding basic reaction product of said sulfonation product, drying said latter product to solid form and thereafter subjecting the dried product in solid form to ultraviolet radiation to obtain a detergent having a lowered Klett number.

References Cited

UNITED STATES PATENTS

| | | | |
|---|---|---|---|
| 2,799,639 | 7/1957 | Huston | 204—158 |
| 3,330,747 | 7/1967 | Muller et al. | 204—158 |
| 3,346,505 | 10/1967 | Blakeway et al. | 252—161 |

HOWARD S. WILLIAMS, Primary Examiner

U.S. Cl. X.R.

204—158

PO-1050
(5/69)

UNITED STATES PATENT OFFICE
CERTIFICATE OF CORRECTION

Patent No. 3,461,053        Dated August 12, 1969

Inventor(s) Harold L. Dimond and Vincent J. Pascarella

It is certified that error appears in the above-identified patent and that said Letters Patent are hereby corrected as shown below:

Column 1, line 50, "$SO_2$" should read -- $SO_3$ --; and line 55, "isoptene-1" should read -- isopentene-1 --. Column 2, line 57-58 delete "sodium succinimide" in the second instance. Column 3, line 33, "elevent" should read -- eleven --; and line 40, "hydroxyalkenesulfonates" should read --hydroxyalkanesulfonates--; and line 57, "inserts" should read -- inerts --. Column 5, line 3 "eicosen-1" should read --eicosene-1 --.

SIGNED AND
SEALED
MAY 19 1970

(SEAL)
Attest:

Edward M. Fletcher, Jr.
Attesting Officer

WILLIAM E. SCHUYLER, JR.
Commissioner of Patents